(12) United States Patent
Wang (10) Patent No.: US 7,706,293 B2
(45) Date of Patent: Apr. 27, 2010

(54) PERFORMANCE MANAGEMENT SYSTEM, APPARATUS AND METHOD BETWEEN RESIDENTIAL GATEWAY AND BROADBAND REMOTE ACCESS SERVER

(75) Inventor: Hao Wang, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 230 days.

(21) Appl. No.: 11/597,574

(22) PCT Filed: May 8, 2006

(86) PCT No.: PCT/CN2006/000902

§ 371 (c)(1),
(2), (4) Date: Apr. 10, 2007

(87) PCT Pub. No.: WO2006/119695

PCT Pub. Date: Nov. 16, 2006

(65) Prior Publication Data

US 2007/0237156 A1    Oct. 11, 2007

(30) Foreign Application Priority Data

May 8, 2005    (CN) .................. 2005 1 0034562

(51) Int. Cl.
*H04L 12/56*    (2006.01)
*H04L 12/28*    (2006.01)

(52) U.S. Cl. .................. 370/249; 370/252; 370/395.1
(58) Field of Classification Search .................. 370/216, 370/401, 395.1, 395.21, 241–253
See application file for complete search history.

(56) References Cited

U.S. PATENT DOCUMENTS 6,424,657 B1 *   7/2002   Voit et al. .................... 370/412

(Continued)

FOREIGN PATENT DOCUMENTS

CN    1592487    3/2005

(Continued)

OTHER PUBLICATIONS

Gavin Young, et al; "DSL Forum Liaison to ITU-T SG 13 on draft Ethernet OAM Recommendations; TD 3", ITU-T Draft Study Period 2001-2004 International Telecommunication Union, Geneva; CH, vol. Study Group 13, Dec. 7, 2004, 16 pages; XP017426831.

(Continued)

*Primary Examiner*—William Trost, IV
*Assistant Examiner*—Emmanuel Maglo
(74) *Attorney, Agent, or Firm*—Ladas & Parry LLP (57) ABSTRACT

The present invention discloses a performance management system, apparatus and method between a Residential Gateway (RG) and a Broadband Remote Access Server (BRAS), the method thereof includes: configuring an OAM IWF for the protocol conversion between the performance management message of the Asynchronous Transfer Mode (ATM) Operation, Administration and Maintenance (OAM) protocol or the point-to-point Ethernet OAM protocol and the performance management message of the service layer Ethernet OAM protocol in a Digital Subscriber Line Access Multiplexer (DSLAM), when the performance management is performed in a broadband IP network, after the OAM IWF configured in the DSLAM performing the protocol conversion of performance management message, performing the end-to-end performance management between an RG and a BRAS according to the performance management message with the converted protocol. This invention can not only enhance the accuracy of the statistics of the traffic flow, but also enhance the accuracy of the SLA test.

4 Claims, 3 Drawing Sheets

U.S. PATENT DOCUMENTS

| | | | |
|---|---|---|---|
| 6,477,595 | B1 | 11/2002 | Cohen |
| 6,977,906 | B2 * | 12/2005 | Owens et al. ............... 370/252 |
| 7,099,305 | B1 * | 8/2006 | Fardid ........................ 370/352 |
| 7,430,187 | B2 * | 9/2008 | Holt et al. ................... 370/329 |
| 2004/0133700 | A1 * | 7/2004 | De Clercq et al. ........... 709/242 |
| 2005/0152370 | A1 * | 7/2005 | Meehan et al. .............. 370/393 |
| 2006/0039367 | A1 * | 2/2006 | Wright et al. ............... 370/382 |
| 2006/0077981 | A1 * | 4/2006 | Rogers ................. 370/395.21 |
| 2006/0098670 | A1 * | 5/2006 | Voit et al. ................... 370/401 |
| 2006/0159008 | A1 * | 7/2006 | Sridhar et al. .............. 370/216 |
| 2006/0285501 | A1 * | 12/2006 | Damm ....................... 370/252 |
| 2007/0014290 | A1 * | 1/2007 | Dec et al. ................... 370/390 |

FOREIGN PATENT DOCUMENTS

| | | |
|---|---|---|
| WO | WO 2004/066601 | 8/2004 |

OTHER PUBLICATIONS

Gilles Joncour France Telecom France; "Q.5/13 Approved Liaisons; TD 15" ITU-T Draft Study Period 2005-2008, International Telecommunication Union, Geneva; CH, vol. Study Group 13, Apr. 25, 2005, pp. 1-16, XP017409666.

Gilles Joncour France Telecom France; "Draft report of the Meeting of Q.5/13 (OAM and network management for NGN); TD 18", ITU-T Draft Study Period 2005-2008, International Telecommunication Union, Geneva: CH, vol. Study Group 13, Apr. 25, 2005, pp. 1-17, XP017409671.

K. Sridhar, et al; "End-To-End Ethernet Connectivity Fault Management in Metro and Access Networks", Internet Citation, [Online] XP002346929 Retrieved from the Internet: URL:http://www.alcatel.com/com/en/appcontent/apl/T0605-CFM-EN_tcm172-2884_01635.pdf> [retrieved Sep. 23, 2005] p. 1, Figures 1 and 2, Mechanisms of Ethernet OAM, pp. 3-5, Internetworking between 802.lag and EFM OAM, pp. 8-9, Figures 14, 15.

"Working Text WT-101 Revision 1 Migration to Ethernet Based DSL Aggregation" DSL Forum, Architecture and Transport Working Group, [Online] May 1, 2004, XP002551671, Retrieved from the Internet: URL:http://www.ieee802.org/1/files/public/docs2004/WT-101v1.pdf>, Chapter 1.2, Fig. 3, Chapter 4.7.

European Search Report: EP 06 72 2436, Nov. 09, 2009.

* cited by examiner

PERFORMANCE MANAGEMENT SYSTEM, APPARATUS AND METHOD BETWEEN RESIDENTIAL GATEWAY AND BROADBAND REMOTE ACCESS SERVER

CROSS-REFERENCE TO RELATED APPLICATIONS

This application is a U.S. national phase application under 35 U.S.C. 371 of International Patent Application No: PCT/CN2006/000902 filed on May 8, 2006, and claims the benefit of priority of Chinese Patent Application No: 200510034562.9 filed on May 8, 2005, the disclosures of all of which are hereby incorporated by reference in their entireties. The International Application was published in Chinese on Nov. 16, 2006 as WO2006/119659.

FIELD OF THE INVENTION

The present invention relates to a performance management method in a broadband network, and in particular, to a performance management system, an apparatus and a method between a Residential Gateway (RG) and a Broadband Remote Access Server (BRAS).

BACKGROUND OF THE INVENTION

Figure 1:
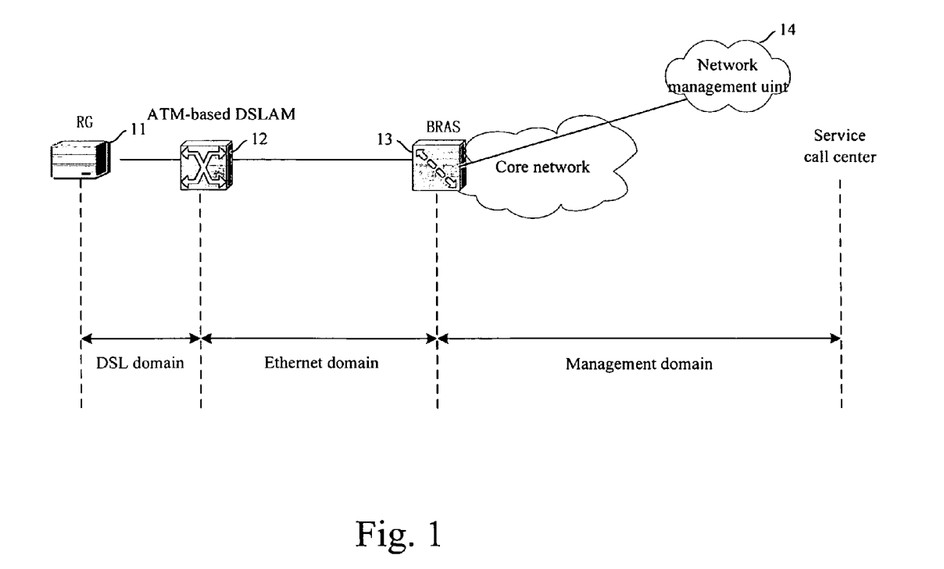
FIG. 1 is a schematic diagram illustrating the networking architecture of a broadband network in the prior art.

The broadband networks have taken shape currently. FIG. 1 is a schematic diagram illustrating the network architecture of a broadband network in the prior art: the broadband network includes an RG 11, a Digital Subscriber Line Access Multiplexer (DSLAM) 12, a BRAS13, a core network and a network management unit 14, which are interconnected successively. The broadband network may be divided into three domains: a Digital Subscriber Line (DSL) domain between the RG11 and the DSLAM12; an Ethernet domain between the DSLAM12 and BRAS13; a management domain between the BRAS13 and the network management unit 14. There may be an Ethernet Switch performing the service switching function in the Ethernet domain, i.e., between the DSLAM12 and the BRAS13.

Herein, the DSLAM12 is a device with perfect asynchronous transmission mode (ATM) architecture, i.e. the ATM-based DSLAM. As the existing metropolitan area ATM core network is not extended any more currently, while the Internet Protocol (IP) broadband metropolitan area core network is new founded, the ATM-based DSLAM will be more and more difficult to suit the requirement of actual networking, along with the available resources of metropolitan area ATM core network decrease day by day. As a result, the DSLAM12 has gradually been evolving from an ATM-based DSLAM into an IP-based DSLAM, thereby enabling the use of a broadband IP network which can provide services, such as, Broadcast Television (BTV), Video On Demand (VOD), voice, high-speed internet access, Virtual Private Network (VPN). Along with the development of various services in broadband IP networks, the management of Service Level Agreement (SLA) will be desired, that is, the serving with different levels are provided to the service with different levels in broadband IP networks.

One main aspect of the performance management between the RG11 and the BRAS13 is to perform SLA tests. In addition, another aspect of the performance management between the RG11 and the BRAS13 is to collect the statistical parameters information of a traffic flow and provide it to an Operation Support System (OSS) for performance analysis and accounting.

In a broadband IP network with an IP-based DSLAM, Ethernet protocols are used in the Ethernet domain between a DSLAM and a BRAS, and ATM or point-to-point Ethernet protocols are used in the DSL domain between an RG and a DSLAM. If the end-to-end performance management is performed between an RG and a BRAS, which requires the RG to support the service layer Ethernet Operation Administration and Maintenance (OAM) protocol. It is difficult to support the service layer Ethernet OAM protocol for the RG in the initial creating phase of a broadband IP network, at present, the service layer Ethernet OAM protocol is only implemented on the DSLAM and the BRAS.

In order to implement the performance management between an RG and a BRAS, currently the statistical parameters information of a traffic flow is mainly extracted by a network management, namely, the network management enquires the statistical parameters information of a traffic flow of every device, for example, the RG, the DSLAM and the BRAS; in order to implement the SLA test, the indexes can be fragmentally measured, such as delay, jittering or packet-loss.

However, the network management performs the flow statistics to every device respectively, and the results are inaccurate, for example, in order to perform the statistics of the traffic flow between an RG and a BRAS, and the statistics of the traffic flow is respectively performed to the RG, to the DSLAM and to the BRAS. The statistical result of the traffic flow in each device can not represent the real flow, which leads to an inaccurate result in the statistics of the traffic flow. And the statistics of the traffic flow need to be manually performed in every device, which is very boring and trivial; in the SLA test, since the SLA test is fragmentally performed, the indexes measured fragmentally, i.e. delay, jittering or packet-loss, can not form the exact end-to-end SLA indexes between the RG and the BRAS, and the results measured fragmentally can not really reflect the situation of end-to-end service operation between the RG and the BRAS, which leads to an inaccurate result in the SLA test, and performing the SLA test fragmentally is very boring and trivial.

SUMMARY OF THE INVENTION

The embodiment of the invention provides a performance management system between an RG and a BRAS, the system can not only enhance the accuracy of the statistics of the traffic flow, but also enhance the accuracy of the SLA test.

The embodiment of the invention also provides a performance management apparatus between an RG and a BRAS, the apparatus can implement the end-to-end performance management instead of the fragment performance management between the RG and the BRAS.

The embodiment of the invention also provides a performance management method between an RG and a BRAS, the method can not only enhance the accuracy of the statistics of the traffic flow, but also enhance the accuracy of the SLA test.

A performance management system between an RG and a BRAS, the system includes: an RG, a DSLAM, a BRAS, a core network and a network management unit, which are interconnected successively. The DSLAM further includes an interworking functional unit, i.e. Operation, Administration and Maintenance InterWorking Function (OAM IWF) used for the protocol conversion between the performance management message of an ATM OAM protocol of the DSL domain or a point-to-point Ethernet OAM protocol between the RG and the DSLAM and the performance management message of the service layer Ethernet OAM protocol between the DSLAM and the BRAS.

A performance management apparatus between an RG and a BRAS, further includes: an OAM IWF, which is used for the protocol conversion between the performance management message of the ATM OAM protocol or the point-to-point Ethernet OAM protocol and the performance management message of the service layer Ethernet OAM protocol.

A performance management method between an RG and a BRAS, which configures an OAM IWF used for a protocol conversion between the performance management message of the ATM OAM protocol or the point-to-point Ethernet OAM protocol and the performance management message of the service layer Ethernet OAM protocol in a DSLAM, the method includes:

the OAM IWF performs a protocol conversion between a performance management message of the ATM OAM protocol or the point-to-point Ethernet OAM protocol and a performance management message of the service layer Ethernet OAM protocol;

the DSLAM performs an end-to-end performance management between an RG and a BRAS according to the performance management message with the converted protocol.

In accordance with the above solutions, an interworking function unit is configured in the DSLAM of a broadband IP network in the embodiments of the invention, which is used for implementing the OAM protocols conversion between the DSL domain and the Ethernet domain. When the performance management is performed, the embodiment of the invention perform the protocols conversion of the performance management message between the RG and the BRAS by the configured interworking function unit and implements the end-to-end performance management, such as the SLA test and the statistics of the traffic flow. As the protocols conversion function of the configured interworking unit implements the end-to-end performance management between the RG and the BRAS, whether the parameters attained by the SLA test or the statistical parameters information attained by the statistics of the traffic flow all can really represent the traffic flow information between the RG and the BRAS, which makes the performance management more accurate. In addition, the network management does not have to perform the SLA test or the fragmental statistics of the traffic flow to every device in a broadband IP network, which makes the performance management more convenient and faster.

EMBODIMENTS OF THE INVENTION

The embodiments of the present invention are further described in details with reference to the accompanying drawings.

Figure 2:
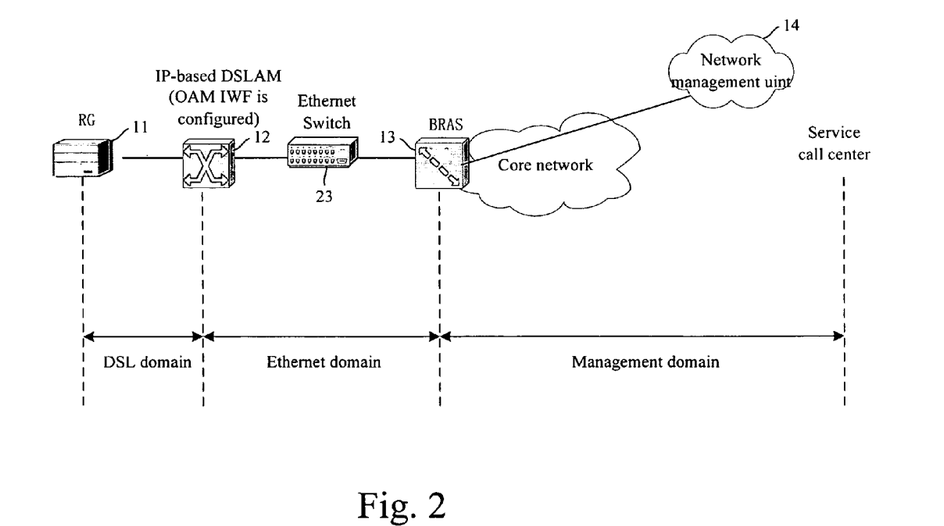
FIG. 2 is a schematic diagram illustrating the networking architecture of a broadband network in an embodiment of the present invention.

FIG. 2 is a schematic diagram illustrating the networking architecture of a broadband network in an embodiment of the present invention, the networking architecture includes an RG 11, an IP-based DSLAM 12, an Ethernet Switch 23, a BRA 13, a core network and a network management unit 14, which are interconnected successively. The broadband network can be divided into three domains: a DSL domain between the RG 11 and the DSLAM 12; an Ethernet domain between the DSLAM 12 and the BRA 13, which further includes an Ethernet Switch 23; a management domain between the BRA 13 and the network management unit 14.

The Ethernet Switch 23 may not be included in this embodiment.

When the performance management is performed in a broadband network, the performance management is performed according to the first OAM protocol in the DSL domain, the first OAM protocol is an ATM OAM protocol or a point-to-point Ethernet OAM protocol; the performance management is performed according to the second OAM protocol in the Ethernet domain, the second OAM protocol is a service layer Ethernet OAM protocol, i.e. a Y. 17ethoam protocol. As the different protocols are used in the DSL domain and the Ethernet domain while the performance management is performed, an interworking function unit (OAM IWF) is configured in the DSLAM12, which is used for the protocols conversion between the first OAM protocol and the second OAM protocol, i.e. the protocols conversion between the service layer Ethernet OAM protocol of the Ethernet domain and the ATM OAM protocol or the point-to-point Ethernet OAM protocol of the DSL domain is performed in the DSLAM12 by the configured OAM IWF. Thus, the end-to-end performance management is implemented between the RG and the BRAS, after the protocols conversion is performed by the configured OAM IWF, the performance management is described in details hereinafter.

The performance test of a broadband IP network can be performed in the service layer Ethernet OAM protocol. In the service layer Ethernet OAM protocol, a maintenance entity, i.e. a bridge port of operators, mainly includes a maintenance entity end point (MEP) and a maintenance entity intermediate point (MIP). The maintenance entity is layered according to the domain it belongs to The domain is defined as 0-7 levels. Thereof lower domains are the physical link layers, higher domains are user layers. The MIP of lower domains is generally the MEP of higher domains. The MEP can initiate an OAM cell and the MIP can only respond to an OAM cell. In this embodiment, the DSLAM can function as a maintenance entity, which includes an MEP and an MIP, that is, the DSLAM can initiate an OAM cell and respond to an OAM cell.

In the service layer Ethernet OAM protocol, the Type-Length-Value code of the MEP identifier ("MEP ID" TLV) is used to identify an MEP. In order to configure the OAM IWF in the DSLAM and implement the protocols conversion, RG-connected DSL identifier is configured in every DSL port which is used to connect with the RG, of the DSLAM. Thus, the protocols conversion can be performed to the OAM IWF configured by the DSLAM according to the performance management information carrying the RG-connected DSL identifier, the converted OAM IWF is send to the confirmed RG, and the performance management is performed by the RG in the Ethernet domain.

The RG-connected DSL identifier can be configured by using the two methods hereinafter.

The first mode: the RG-connected DSL identifier can be configured as a Type-Length-Value code of the virtual maintenance entity end point identifier ("vMEP ID"TLV), which is used to respectively identify every RG connected with the DSL port of the DSLAM. In the embodiment of the invention, the "vMEP ID"TLV adopts 13 bits, which can identifies 8192 ports.

The second mode: the RG-connected DSL identifier can be configured as a Type-Length-Value code of the circuit identifier ("Circuit ID" TLV), which is used to respectively identify the DSL ports by which the DSLAM is connected with the RG. The detailed form of "Circuit ID" TLV is: node identifier+frame number/slot number/subslot number/port number+[vpi,vci]+[vlan]. The node identifier is a character string, the Media Access Control (MAC) address of the RG can be adopted as the node identifier by default, for example: 00-E0-FC-0D-DC-EC; the network management can further configure and modify the form of "Circuit ID" TLV via the network management interface, for example, the form of "Circuit ID" TLV is modified as "exchange name+the number of device in exchange", the detailed form is: AccessNodeIdentifier {atm|eth} frame/slot/subslot/port[:vpi.vci|vlan], wherein the AccessNodeIdentifier, i.e. access node identifier, is a character string of which the length is not more than 50 characters, and is adopted as the MAC address of the DSLAM by default; the frame is a frame number; the atm|eth is the type of ports; the slot is a slot number; the subslot is a subslot number; the port is a port number; the vpi.vci is a PVC identifier; the vlan is a VLAN identifier.

This performance management process is hereinafter described in details. In the performance management process of OAM, the following parameters can be measured and obtained:

the SLA test parameters of the service include the indexes, such as delay, jittering, packet-loss rate or service viability; the statistical parameters information of the traffic flow include the number of frames transmitted, the number of frames received, the number of error frames and the number of frames dropped, etc.

The method for measuring and obtaining the SLA test parameters and the statistical parameters information of the traffic flow is hereinafter described in details.

Figure 3:
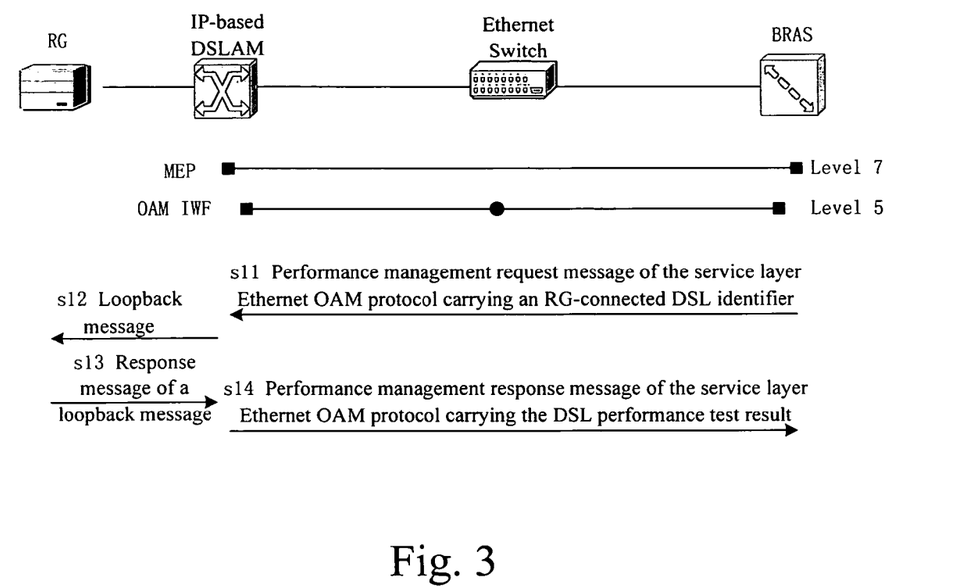
FIG. 3 is a schematic diagram illustrating the SLA test of the □ service which is performed in the performance management method between the RG and the BRAS in an embodiment of the present invention.

FIG. 3 is a schematic diagram illustrating the SLA test of the service which is performed in the performance management method between the RG and the BRAS, and FIG. 3 primarily includes the following steps:

Step s11. a BRAS sends a performance management request message of the service layer Ethernet OAM protocol carrying an RG-connected DSL identifier to a DSLAM.

The RG-connected DSL identifier can adopt the above mentioned "Circuit ID" TLV or "vMEP ID" TLV.

Step s12. the message is converted into a loopback message of the ATM OAM protocol or the point-to-point Ethernet OAM protocol, after the DSLAM performs the protocols conversion to the message by the configured OAM IWF. The DSLAM determines an RG according to the RG-connected DSL identifier carried by the message in Step s11 and sends the loopback message to the determined RG.

Step s13. after performing the DSL performance test, the RG receiving the loopback message sends a response message for the loopback message of the ATM OAM protocol or the point-to-point Ethernet OAM protocol by which the DSL performance test result is carried to the DSLAM.

Step s14. after performing the protocols conversion to the response message by the configured OAM IWF, the DSLAM achieves a performance management response message of the service layer Ethernet OAM protocol that carries the DSL performance test result and sends the received response message to the BRAS.

In order to make the BRAS can determine the RG from which the DSL performance test result is achieved, an RG-connected DSL identifier can further be carried in the response message, the RG-connected DSL identifier can adopt the above mentioned "Circuit ID" TLV or "vMEP ID" TLV.

The method for testing the DSL performance and achieving the DSL performance test result of the RG is the same as those of the prior art.

The detailed description is given by taking delay and jittering indexes in the SLA parameters of the test service as an example.

A Sequence number and Request Timestamp are included in the performance management request message of the service layer Ethernet OAM protocol sent from the BRAS to the DSLAM. After receiving the request message and performing the protocols conversion to the request message, the DSLAM sends the converted request message contained in a loopback message of the ATM OAM protocol or the point-to-point Ethernet OAM protocol to the RG for a DSL performance test. The RG returns the response message of the loopback message carrying the DSL performance test result to the DSLAM, the DSL performance test result further includes the Current Timestamp and Sequence number obtained by testing. After performing the protocols conversion to the response message, the DSLAM sends the converted response message to the BRAS. After the BRAS receives the response message of the performance management request message of the service Ethernet OAM protocol carrying the DSL performance test result, the delay and the jittering indexes can be achieved according to the following method:

Frame Delay (FD)=Current Timestamp−Request Timestamp (Frame Delay Variation (FDV) or Jitter)={FD (max)−FD (min)} per measurement time interval, namely, the jittering index is equal to the difference between the maximal frame delay and the minimal frame delay per measurement time interval.

In order to implement the enquiry and the report of the statistical parameters information of the traffic flow, the service layer Ethernet OAM protocol will be further extended in this embodiment, i.e. the DSL Port Performance TLV is configured in the DSL port of the DSLAM, in the actual implementation, one optional format of the "Port Performance" TLV is: {atm|eth} [atm statistics|eth statistics].

The reporting process of the statistical parameters information of the service flow is hereinafter described in details.

Figure 4:
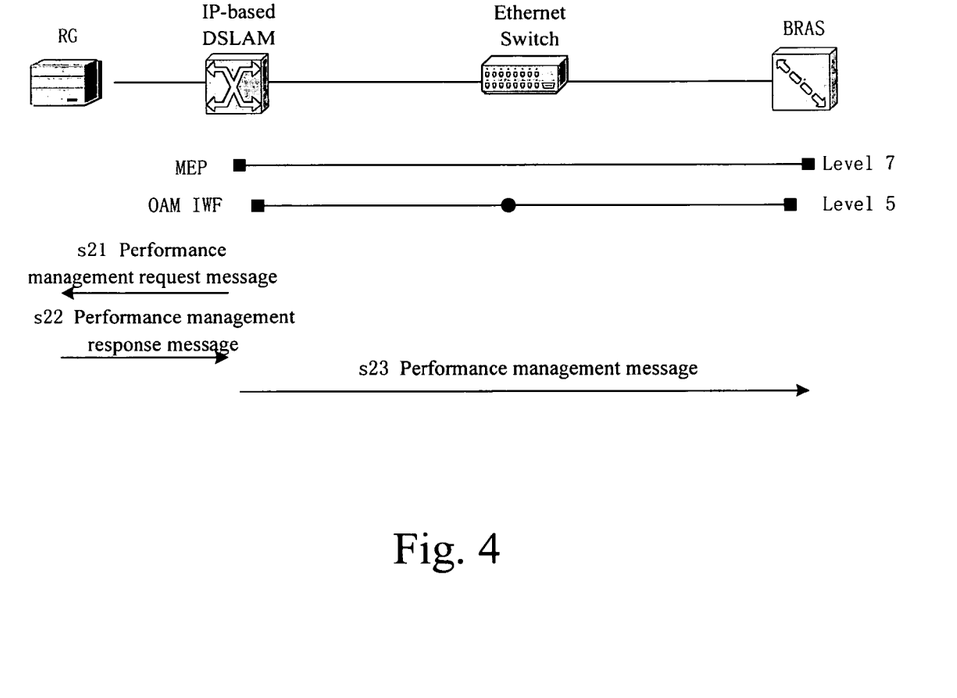
FIG. 4 is a schematic diagram illustrating the report of the statistical parameters information of the traffic flow by using the active mode in the performance management method between the RG and the BRAS in an embodiment of the present invention.

FIG. 4 is a schematic diagram illustrating the report of the statistical parameters information of the traffic flow by using the active mode in the performance management method between the RG and the BRAS, which includes the following steps:

s21. the DSLAM sends a performance management request message of the ATM OAM protocol or the point-to-point Ethernet OAM protocol to an RG which needs performing the statistics of the traffic flow.

s22. after performing the DSL performance test, the RG receiving the performance management request message sends a performance management response message of the ATM OAM protocol or the point-to-point Ethernet OAM protocol carrying the DSL performance test result to the DSLAM.

s23. the DSLAM determines that the DSL "Port Performance" TLV of the response message is received, and after performing the protocols conversion to the response message by the configured OAM IWF, the DSLAM sends the performance management message of the service layer Ethernet OAM protocol carrying the confirmed "Port Performance" TLV to the BRAS, the message further carries the DSL performance test result.

A "vMEP ID" TLV or "Circuit ID" TLV is further included in the performance management message sent from the DSLAM to the BRAS. After receiving the performance management message, the BRAS can create the binding relationship between the "Port Performance" TLV and the "vMEP ID" TLV or the "Circuit ID" TLV according to what the performance management message carries. Hence, the report of the statistical parameters information of the traffic flow can be implemented.

Figure 5:
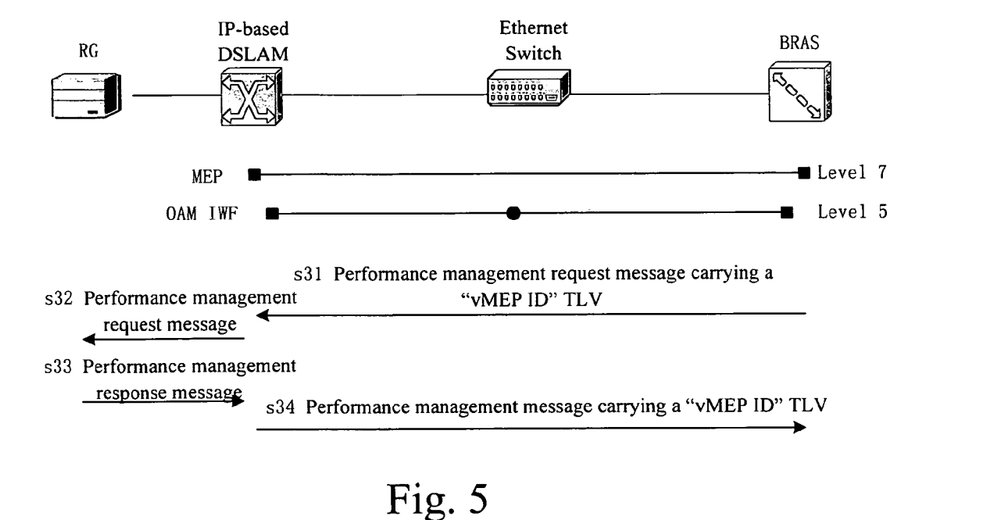
FIG. 5 is a schematic diagram of an embodiment illustrating the report of the statistical parameters information of the traffic flow by using the passive mode in the performance management method between the RG and the BRAS.

FIG. 5 is a schematic diagram of an embodiment illustrating the report of the statistical parameters information of the traffic flow of Embodiment 1 by using the passive mode in the performance management method between the RG and the BRAS, which includes the following steps:

Step s31. a BRAS sends a performance management request message of the service layer Ethernet OAM protocol carrying the "vMEP ID" TLV to a DSLAM.

Step s32. the performance management request message is converted into a performance management request message of the ATM OAM protocol or the point-to-point Ethernet OAM protocol, after the DSLAM performs the protocols conversion to the message by the configured OAM IF, and the DSLAM determines an RG according to the "vMEP ID" TLV carried by the message in Step s31 and sends the performance management request message with the converted protocols to the confirmed RG.

Step s33. after performing the DSL performance test, the RG receiving the performance management request message with converted protocol sends a performance management response message of the ATM OAM protocol or the point-to-point Ethernet OAM protocol carrying the DSL performance test result to the DSLAM.

Step s34. the DSLAM determines that the DSL "Port Performance" TLV of the response message is received, and after performing the protocols conversion to the response message by the configured OAM IWF Other DSLAM sends the performance management message of the service layer Ethernet OAM protocol carrying the determined "Port Performance" TLV to the BRAS, which further carries the DSL performance test result.

In order to make the BRAS can determine the RG from which the DSL performance test result is achieved, a "vMEP ID" TLV can further be carried in the response message.

In FIG. 5, the end-to-end statistical process of the traffic flow is initiated by a BRAS, a "vMEP ID" TLV is carried in the delivered performance management message of the service layer Ethernet OAM protocol. After receiving the management message, a DSLAM initiates the statistical process of the traffic flow of the DSL domain by using the ATM OAM protocol or the point-to-point Ethernet OAM protocol and sends the performance management response message of the service layer Ethernet OAM protocol carrying the DSL performance test result and including a "vMEP ID" TLV and a "Port Performance" TLV to the BRAS. Hence, the statistical parameters information of the traffic flow can be reported to the BRAS.

Figure 6:
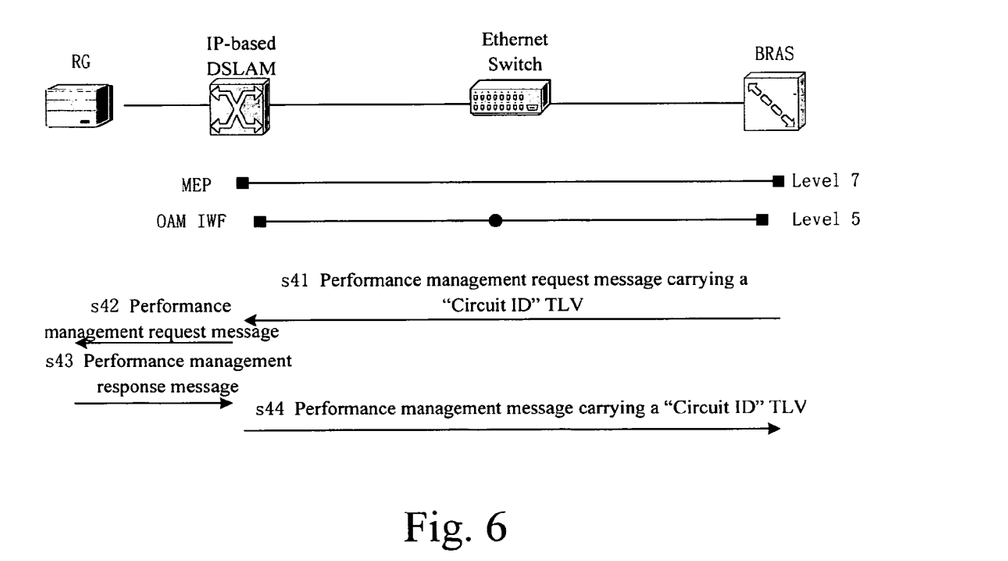
FIG. 6 is a schematic diagram of another embodiment illustrating the report of the statistical parameters information of the traffic flow by using the passive mode in the performance management method between the RG and the BRAS.

For the service using the "Circuit ID" TLV, the statistical parameters information of the traffic flow can further be reported. FIG. 6 is a schematic diagram of another embodiment illustrating the report of the statistical parameters information of the traffic flow of Embodiment 2 by using the passive mode in the performance management method between the RG and the BRAS, which includes the following steps:

Step s41. the BRAS sends a performance management request message of the service layer Ethernet OAM protocol carrying the "Circuit ID" TLV to a DSLAM.

Step s42. after the DSLAM performs the protocols conversion to the performance management request message by the configured OAM IWF, the performance management request message is converted into a performance management request message of the ATM OAM protocol or the point-to-point Ethernet OAM protocol, the DSLAM determines an RG according to the "Circuit ID"

TLV carried by the performance management request message in Step s41, and sends the performance management request message with the converted protocols to the determined RG.

Step s43. after performing the DSL performance test, the RG receiving the performance management request message with the converted protocols sends a performance management response message of the ATM OAM protocol or the point-to-point Ethernet OAM protocol carrying the DSL performance test result to the DSLAM.

Step s44. the DSLAM determines that the DSL "Port Performance" TLV of the response message is received, and after performing the protocols conversion to the response message by the configured OAM IWF, the DSLAM sends the performance management message of the service layer Ethernet OAM protocol carrying the confirmed "Port Performance" TLV to the BRAS, which further carries the DSL performance test result.

In order to make the BRAS can determine the RG from which the DSL performance test result is achieved and a "Circuit ID" TLV can further be carried in the response message.

In FIG. 6, the end-to-end statistical process of the traffic flow is initiated by a BRAS, a "Circuit ID" TLV is carried in the delivered performance management message of the service layer Ethernet OAM protocol. After receiving the management message, a DSLAM initiates the statistical process of the traffic flow of the DSL domain by using the ATM OAM protocol or the point-to-point Ethernet OAM protocol and sends the performance management response message of the service layer Ethernet OAM protocol to the BRAS, and the performance management response message carries the DSL performance test result and includes a "Circuit ID" TLV and a "Port Performance" TLV. Hence, the statistical parameters information of the traffic flow can be reported to the BRAS.

The purpose, technical solution and merits of this invention have been further described in detail by the above mentioned embodiments. It should be appreciated that the foregoing is only embodiments of this invention and is not for use in limiting the invention. Any modification, equivalent substitution, improvement within the spirit and principle of the invention should be covered in the protection scope as defined by the appended claims.

The invention claimed is:

1. A system for implementing performance management between a Residential Gateway (RG) and a Broadband Remote Access Server (BRAS), comprising:
a Digital Subscriber Line Access Multiplexer (DSLAM) connected to the RG and to the BRAS, respectively, wherein:
the DSLAM further comprises an interworking function Operation, Administration and Maintenance InterWorking Function (OAM IWF) for a Protocol conversion between a performance management message of an Asynchronous Transfer Mode (ATM) OAM protocol or a point-to-point Ethernet OAM protocol of the Digital Subscriber Line (DSL) domain between the RG and the DSLAM and a performance management message of the service layer Ethernet OAM protocol between the DSLAM and the BRAS, wherein the performance management comprises performing a parameter test of service level agreement (SLA) or reporting the statistical parameters information of a traffic flow;
an RG-connected DSL identifier is configured in a DSL port of the DSLAM;
the DSLAM determines an RG according to the RG-connected DSL identifier carried in the performance management message;
the end-to-end performance management between the determined RG and the BRAS is performed according to the performance management message of the converted protocol; and wherein:
when the performance management comprises performing the parameter test of SLA,
the BRAS sends a performance management request message of the service layer Ethernet QAM protocol carrying the RG-connected DSL identifier to the DSLAM;
the DSLAM converts the performance management request message into a loopback message of the ATM OAM protocol or the point-to-point Ethernet OAM protocol through the configured OAM IWF;
the DSLAM determines the RG according to the RG-connected DSL identifier carried by the message and sends the loopback message to the determined RG;
the RG receiving the loopback message performs the DSL performance test and sends a response message for the loopback message of the ATM OAM protocol or the point-to-point Ethernet OAM protocol by which the DSL performance test result is carried to the DSLAM; and
upon performing the protocols conversion to the response message through the configured OAM IWF, the DSLAM obtains a performance management response message of the service layer Ethernet OAM protocol carrying the DSL performance test result, and sends the obtained response message to the BRAS.

2. The system according to claim 1, wherein the performance management request message further carries a Sequence number and a Request Timestamp;
the DSL performance test result comprises the measured Current Timestamp and Sequence number;
upon receiving the response message sent from the DSLAM, the BRAS determines a delay index and a uttering index of the SLA parameters according to the Sequence number, the Request Timestamp, the Current Timestamp and the Sequence number.

3. A system for implementing performance management between a Residential Gateway (RG) and a Broadband Remote Access Server (BRAS), comprising:
a Digital Subscriber Line Access Multiplexer (DSLAM) connected to the RG and to the BRAS, respectively, wherein:
the DSLAM further comprises an interworking function Operation, Administration and Maintenance InterWorking Function (OAM IWF) for a protocol conversion between a performance management message of an Asynchronous Transfer Mode (ATM) OAM protocol or a point-to-point Ethernet OAM protocol of the Digital Subscriber Line (DSL) domain between the RG and the DSLAM and a performance management message of the service layer Ethernet OAM protocol between the DSLAM and the BRAS, wherein the performance management comprises performing a Parameter test of service level agreement (SLA) or reporting the statistical parameters information of a traffic flow;
an RG-connected DSL identifier is configured in a DSL Port of the DSLAM;
the DSLAM determines an RG according to the RG-connected DSL identifier carried in the Performance management message;
the end-to-end performance management between the determined RG and the BRAS is performed according to the performance management message of the converted protocol; and
wherein:
when the performance management comprises reporting the statistical parameters information of the traffic flow, the DSL port of the DSLAM configures a DSL "Port Performance" TLV;
the DSLAM sends a performance management request message of the ATM OAM protocol or the point-to-point Ethernet OAM protocol to the RG which needs the statistics of the traffic flow;
upon performing the DSL performance test, the RG which receives the performance management request message sends a performance management response message of the ATM OAM protocol or the point-to-point Ethernet OAM protocol carrying the DSL performance test result to the DSLAM; and
the DSLAM determines that the DSL "Port Performance" TLV of the response message is received; upon performing the protocols conversion to the response message through the configured OAM IWE, the DSLAM sends the performance management message of the service layer Ethernet CAM protocol carrying the confirmed "Port Performance" TLV to the BRAS, wherein the performance management message further carries a DSL performance test result.

4. A system for implementing performance management between a Residential Gateway (RG) and a Broadband Remote Access Server (BRAS), comprising:
a Digital Subscriber Line Access Multiplexer (DSLAM) connected to the RG and to the BRAS, respectively, wherein:
the DSLAM further comprises an interworking function Operation, Administration and Maintenance InterWorking Function (OAM IWF) for a protocol conversion between a performance management message of an Asynchronous Transfer Mode (ATM) OAM protocol or a point-to-point Ethernet OAM protocol of the Digital Subscriber Line (DSL) domain between the RG and the DSLAM and a performance management message of the service layer Ethernet OAM protocol between the DSLAM and the BRAS, wherein the performance management comprises performing a parameter test of service level agreement (SLA) or reporting the statistical parameters information of a traffic flow;

an RG-connected DSL identifier is configured in a DSL port of the DSLAM;

the DSLAM determines an RG according to the RG-connected DSL identifier carried in the performance management message;

the end-to-end performance management between the determined RG and the BRAS is performed according to the Performance management message of the converted protocol; and wherein:

when the performance management comprises reporting the statistical parameters information of the traffic flow, the DSL port of the DSLAM configures a DSL "Port Performance" TLV;

the BRAS sends a performance management request message of the service layer Ethernet OAM protocol carrying the RG-connected DSL identifier to the DSLAM;

upon performing the protocols conversion to the performance management request message through the configured OAM IWF, the DSLAM converts the performance management request message into a performance management request message of the ATM OAM protocol or the point-to-point Ethernet OAM protocol; the DSLAM determines an RG according to the RG-connected DSL identifier and sends the performance management request message with the protocol conversion to the determined RG;

upon performing the DSL performance test, the RG which receives the performance management request message with the converted protocol sends a performance management response message of the ATM OAM protocol or the point-to-point Ethernet OAM protocol carrying the DSL performance test result to the DSLAM;

the DSLAM determines that the DSL Port Performance TLV of the response message is received; upon performing the protocols conversion to the response message through the configured OAM IWF, the DSLAM sends the performance management message of the service layer Ethernet OAM protocol carrying the confirmed Port Performance TLV to the BRAS, wherein the performance management message further carries a DSL performance test result.

* * * * *